May 26, 1936.  A. GARELLI  2,042,043
RECIPROCATING ENGINE
Filed Jan. 2, 1934  2 Sheets-Sheet 2

INVENTOR
Adalberto Garelli
by his attorneys
Byrnes, Stebbins, Parmelee & Blenko

Patented May 26, 1936

2,042,043

UNITED STATES PATENT OFFICE 2,042,043

RECIPROCATING ENGINE

Adalberto Garelli, Milan, Italy

Application January 2, 1934, Serial No. 705,013

1 Claim. (Cl. 121—194)

This invention comprises improvements in reciprocating engines and is especially intended to apply to high speed engines of the internal-combustion type. In engines of this kind, particularly in small sizes, difficulty is experienced in providing adequately for supporting end forces which may be applied to the crank-shaft without leading either to overheating of the parts or to undue complication in the design. It is an object of the present invention to provide a simple design of reciprocating engine in which end thrust upon the crankshaft is adequately taken care of. The nature of the invention will be readily understood from the following description and its scope will be hereinafter pointed out in the appended claim.

The accompanying drawings illustrate by way of example one form of engine constructed in accordance with the present invention.

Figure 1:
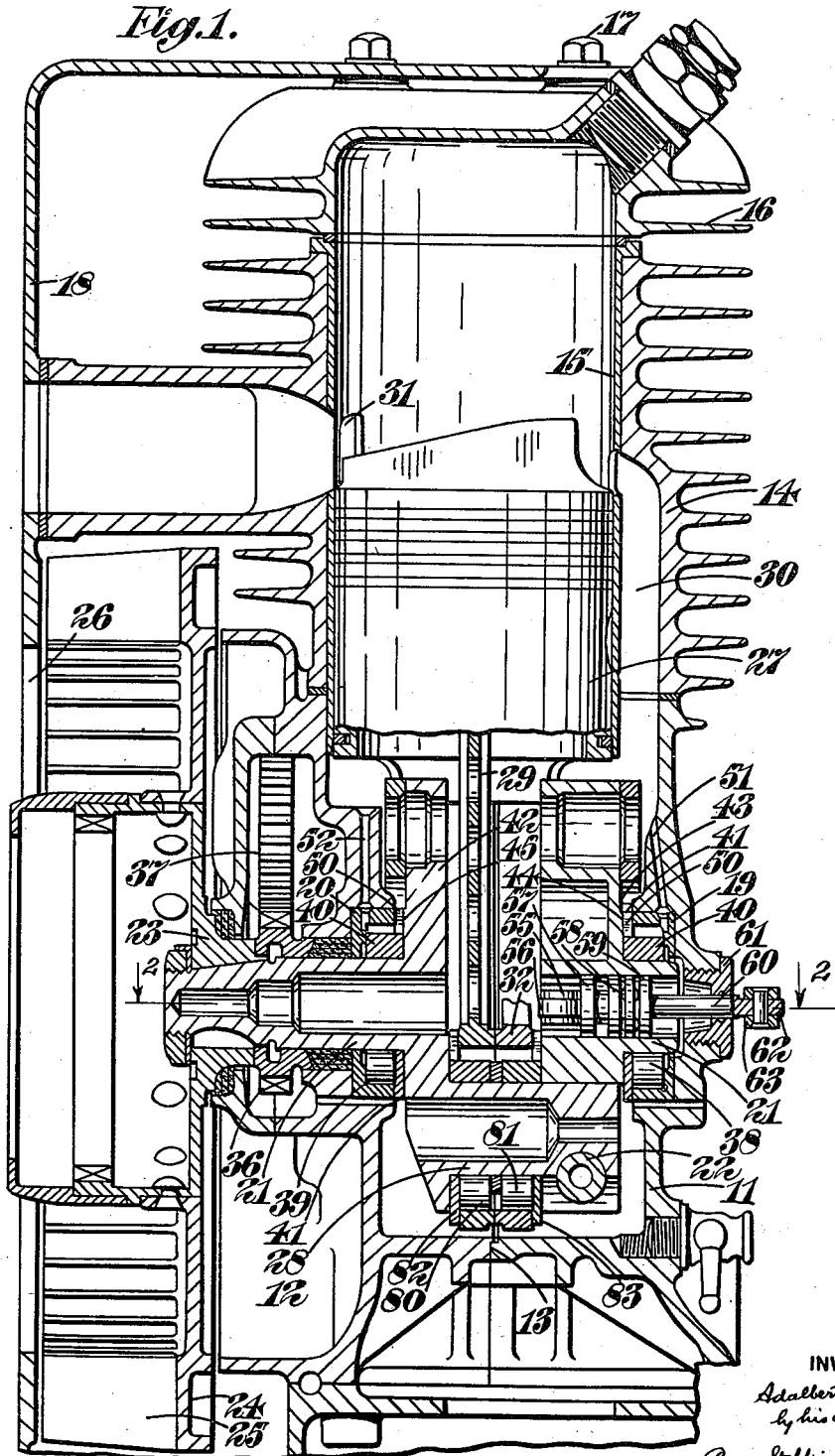

Figure 1 being a vertical central section of the engine taken in a plane which lies in the axis of the crankshaft.

Figure 2:
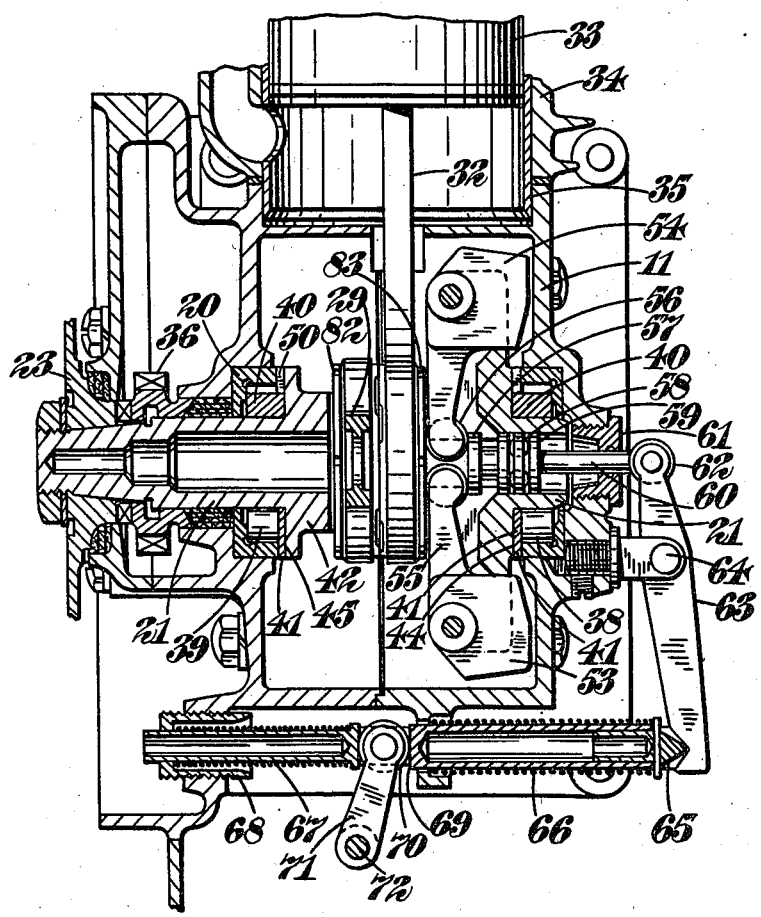

Figure 2 a horizontal section, taken on line 2—2 of Fig. 1 and

Figure 3:
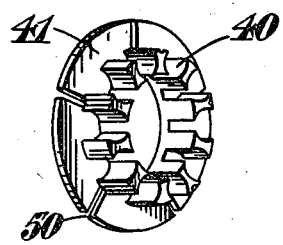

Figure 3 a detail of a thrust washer.

Referring to Figure 1, 11, 12 represent two parts of a vertically divided crank case united by a joint at 13. To the upper part of the crank case there is secured a finned air-cooled cylinder 14 provided with a liner 15 and a detachable head 16. These parts are held together by holding-down bolts 17 which also serve to secure in place a casing 18.

Housed in the two halves 11, 12 of the crank case are main bearings 19, 20 which support a crankshaft 21 formed in two parts held together by a cotter bolt 22. To one end of the crankshaft 21 there is secured a fly wheel head 23 the rim 24 of which is provided with radial vanes 25 to constitute a cooling fan. The casing 18 is provided with an inlet 26 for cooling air, which inlet is co-axial with the crankshaft 21 and coincides with the inner periphery of the vanes 25. The casing 18 receives air delivered by the fly wheel 24 and directs it to and through the cooling fins of the cylinder 14.

Within the cylinder liner 15 works a piston 27 coupled to a crank pin 28 of the crankshaft 21 by means of a connecting rod 29. The engine is of the two-stroke type with crank-case compression and comprises a transfer port 30 and exhaust port 31, these parts being disposed so as to act in conjunction with a special shape of cylinder head in a manner usual in internal-combustion engine practice with two-stroke engines.

Upon the crank pin 28 is a second connecting rod 32 which, as will be seen in Figure 2, is connected to a second piston 33 working in a second cylinder 34 provided with a liner 35 and located on an axis at right angles to the axis of the cylinder 14. In the particular embodiment illustrated in the drawings this second cylinder constitutes an air compressor cylinder, the compressor portion being driven by the power cylinder 14 and its associated parts already described. The compressor cylinder will not be herein further described as it constitutes no part of the present invention. Upon the crankshaft 21 there is mounted an ignition timing pinion 36 which is connected to a magneto, not shown in the drawings, through an intermediate idler-gear 37, and the idler gear 37 preferably comprises a connection to a starting device similar to that illustrated in my prior United States Patent No. 1,887,902.

The main bearings 19, 20 comprise outer races with cylindrical raceways in which work anti-friction rollers 38, 39. The crankshaft 21 is hardened and ground so as to afford a working surface which is engaged directly by the anti-friction rollers, but an inner raceway may be provided upon the crankshaft if desired instead of utilizing the ground surface of the crankshaft as a raceway. The rollers 38, 39 are held spaced from one another by cages 40 having radial flanges 41 and the arrangement and disposition of these parts constitute an important feature of the present invention.

The shape of the roller cages 40 can be seen from Figure 3 of the drawings and it will be observed that they are in the illustrated instance integral with the radial flanges 41 which are thereby constrained to rotate along with the rollers at the natural speed of the latter which is lower than the speed of rotation of the crankshaft, and is, indeed, of the order of approximately one-half of the crankshaft speed. The flanges 41 constitute thrust washers which lie between the crank webs 42, 43 of the crankshaft 21 and the adjacent faces of the main bearings 19, 20 and engage each other beyond the rollers. The crank webs have co-operating faces 44, 45 which also engage the thrust washers beyond the rollers. Consequently the crank webs are prevented from directly touching the main bearings and the rubbing speed at the faces 44 is reduced to approximately one-half, the remainder of the rubbing speed being taken between the thrust washers and the fixed faces of the bearings 19, 20. This eliminates risk of overheating of these parts in a very simple manner, even if the crankshaft should be subjected to considerable end thrust, as may occur either from tilting of the motor or from the action of the centrifugal governor as hereinafter described or by other or accidental causes.

In order to ensure thorough lubrication of the thrust washers 41 they are radially slitted as shown at 50, Figures 1 and 3, from a point which lies in communication with the interior of the main bearing 19 to their outer edge. They therefore tend by centrifugal force to throw oil outwards radially from the main bearing. There is an inlet 51, 52 for oil to each main bearing so that the supply is continually replenished and thus the rollers as well as the thrust washers are always kept freshly lubricated.

Referring to Figure 2, it will be observed that upon the crank web 41 of the crankshaft there are pivoted governor weights 53, 54 in a manner similar to that described in my co-pending United States Patent application Serial No. 660,303. These governor weights comprise operating arms 55 which extend radially inwards into engagement through rollers 56 with a collar 57 co-axial with the shaft 21. The collar 57 presses through a ball bearing 58 upon a head 59 of a co-axial thrust rod 60 which passes out through the side of the crank case 11 through a gland nut 61. The thrust rod 60 presses upon a roller 62 on a governor lever 63 pivoted at 64 to the crank case and pressing at its other end upon a push rod 65. The push rod 65 is urged in the direction which tends to oppose the action of the governor weights 53 by a main spring 66 and an adjustable auxiliary spring 67, which latter finds its seating in an adjusting nut 68. The push rod is slotted at 69 to receive a roller 70 on a throttle lever 71 mounted on a throttle spindle 72 which automatically actuates the carburettor-throttle on the air intake to the engine. The carburettor is not shown in the drawings as it constitutes no part of the present invention.

It will be observed that the thrust exerted by the governor weights 53 upon the thrust rod 60 tends by its reaction to force the crankshaft away from the thrust rod 60 and the amount of this end thrust is borne by the thrust washer 41 of the main bearing 20, where it lies between the face 45 of the crank web 42 and the co-operating face of the main bearing. It is found that for very high speed working the provision of such a thrust washer is important in conjunction with the governor described for the purpose of permitting the governor to be designed with ample power and yet of preventing overheating of the thrust faces.

The connecting rods 29, 32 upon the crank pin 28 are provided with roller bearings 80, 81 and these also carry roller cages which are provided with thrust washers 82, 83 similar to the thrust washers 41 of the main bearings. The thrust washers 82, 83 lie between the said faces of the connecting rods and the adjacent faces of the crank webs, and it is found that this disposition is also advantageous in avoiding overheating at high speeds.

I claim:—

In a reciprocating engine the combination of a crank case, opposed main bearing housings therein, main bearings located in said housings and comprising outer raceways and rolling anti-friction members within them, a crankshaft rotatably mounted in said anti-friction members and comprising crankwebs located between them, cages for said anti-friction members, a flange carried by each cage in frictional engagement with the housings and the crankwebs beyond the anti-friction members, whereby the speed of the flanges on the cages is lower than the crankshaft and is moved by the anti-friction members.

ADALBERTO GARELLI.